April 6, 1954
W. M. NICHOLS
2,674,086
EXHAUST MANIFOLD
Filed June 14, 1952
2 Sheets-Sheet 1
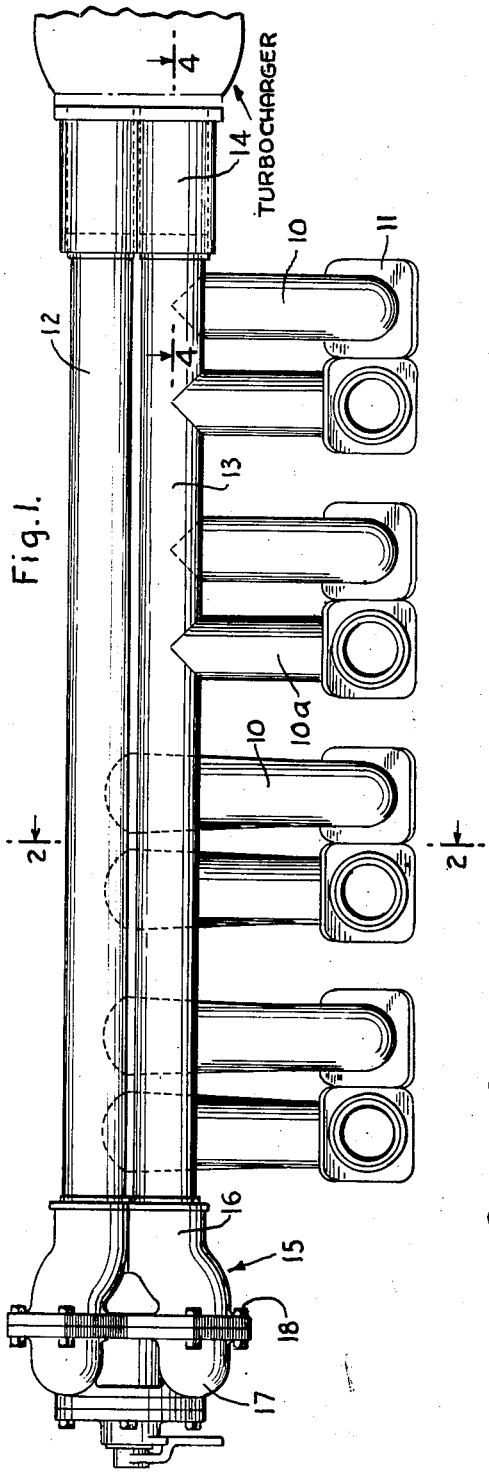
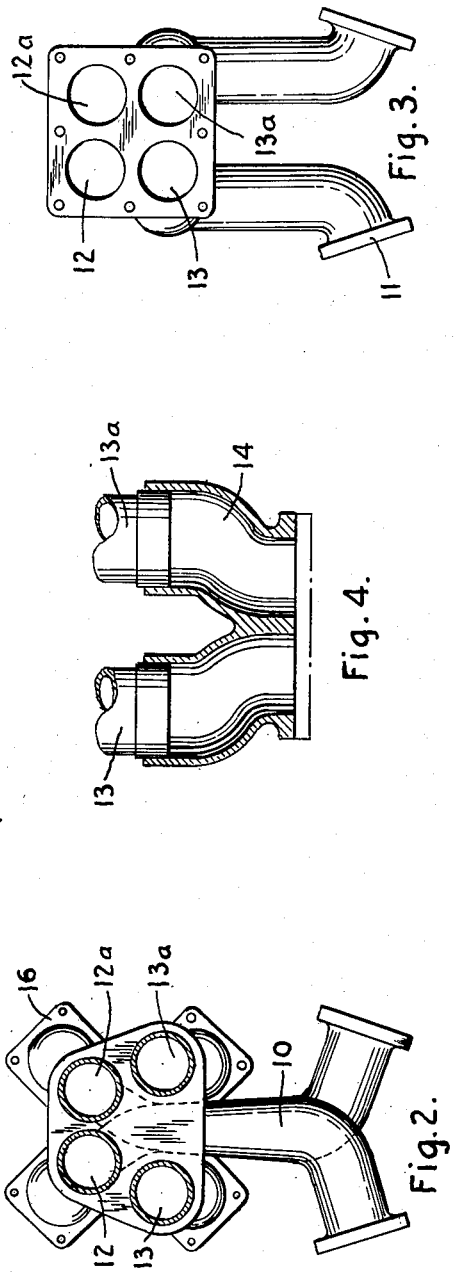
WILLIAM M. NICHOLS
INVENTOR
BY *Maurice W. Grady*
ATTORNEY April 6, 1954 W. M. NICHOLS 2,674,086
EXHAUST MANIFOLD
Filed June 14, 1952 2 Sheets-Sheet 2
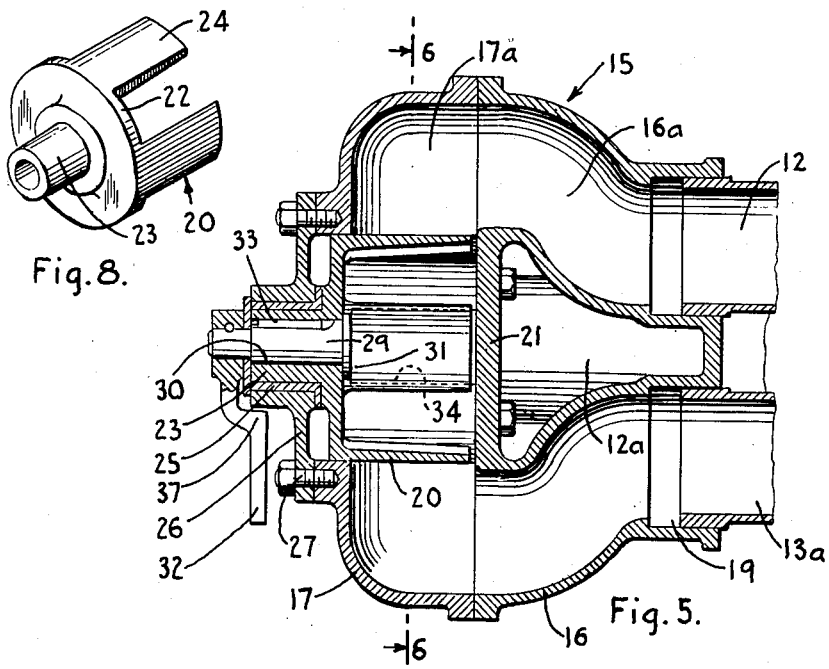
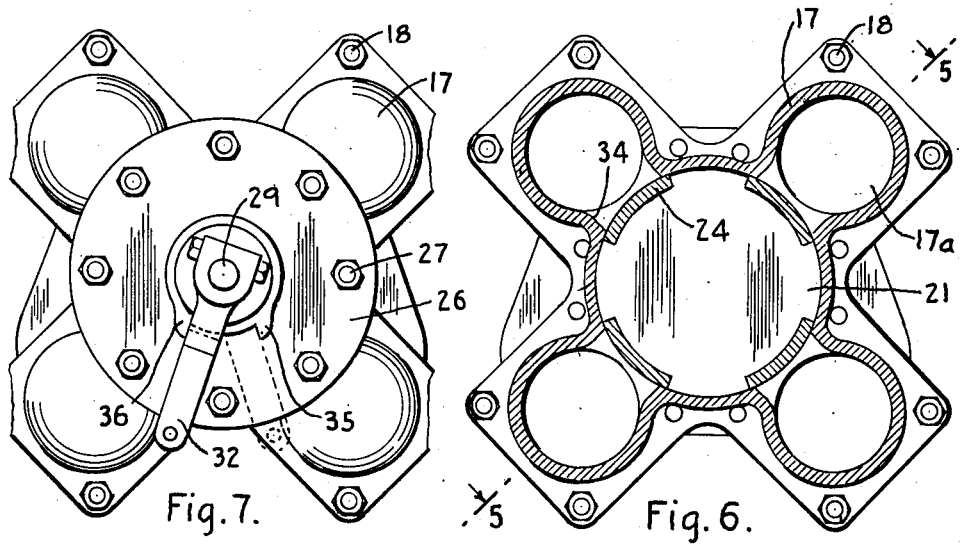
WILLIAM M. NICHOLS
INVENTOR
BY Maurice W. Grady
ATTORNEY Patented Apr. 6, 1954

2,674,086

UNITED STATES PATENT OFFICE 2,674,086

EXHAUST MANIFOLD

William M. Nichols, Schenectady, N. Y., assignor to American Locomotive Company, New York, N. Y., a corporation of New York Application June 14, 1952, Serial No. 293,638

5 Claims. (Cl. 60—29)

This invention relates to an exhaust manifold for internal combustion engines and particularly to such a manifold for use on a high speed supercharged diesel engine.

It is common practice in high speed diesel engines to transmit the exhaust gases from each cylinder through manifold piping against the blading of the turbine of a supercharger, commonly called a turbocharger, which by means of a compressor, supercharges the cylinders to support combustion therein.

In the attempt to attain higher power output from such engines, increased supercharging has been resorted to, but problems in connection with the exhaust manifolding have arisen in connection therewith.

It is known that multiple piping is the most efficient arrangement of the exhaust manifold when the engine is accelerating or operating at low load but that a single large exhaust pipe is more efficient when the engine is under full load. Conversely, a single large pipe is more inefficient at low load or accelerating conditions; whereas a multiple pipe manifold is more inefficient at full load conditions.

When the engine is at low load in acceleration, the cylinders exhaust into the manifold piping in a series of puffs or slugs, each puff representing a high percentage of the total energy of the cylinder exhaust. Under such conditions, the puff dissipates itself in a large single pipe which, acting as a plenum chamber, absorbs the puff and prevents it from reaching the turbine in the form of a puff. On the other hand, a small pipe and nozzle permits the puff to reach the turbine to act thereon.

When the engine is operating under full load, the puff energy from the cylinders represents a relatively small part of the total available energy and it is therefore preferable to feed the exhaust into a large pipe which absorbs the puffs to become charged at a constant pressure. The charged pipe can then supply the turbine with a relatively large nozzle area which responds to the pressure effects over its entire area so that the turbine runs under constant pressure conditions.

Therefore, a compromise has been resorted to in order to afford the most effective operation under such mutually exclusive conditions. The compromise generally consists of a multiple pipe system that is too large for best acceleration conditions and too small for best full load conditions. Each pipe is fed by a plurality of cylinders. For example, in an eight cylinder engine with four pipes, two cylinders feed each pipe. Such a compromise, while heretofore reasonably satisfactory, under existing supercharging requirements, has been completely unsatisfactory as higher supercharging has been attempted.

In order to obtain higher pressure from the exhaust manifold, one obvious means is to reduce the nozzle area at the turbine. Unless the pipe feeding the nozzle is also decreased in size, however, the problem of wave reflection is encountered since all the puff cannot pass through the nozzle and part is reflected. The reflected gas travels back through the exhaust pipe to interfere with the scavenging of its own cylinder and/or the exhaust of other cylinders that feed into the same pipe. The pipe may be reduced in size but the extent of such reduction is limited because of frictional losses.

The principal object of the present invention is to provide an exhaust manifold for a compression ignition engine which will function efficiently under increased supercharging conditions.

Another object is to provide such a manifold in which the exhaust gases pass through a multi-piping arrangement to the supercharger when the engine is operating at low load or is accelerating and through a single pipe to the supercharger when the engine is operating under full load.

Still another object is to provide such a manifold having a plurality of pipes into each one of which the exhausts of a plurality of cylinders is emptied at intervals, the pipes having the same length and being connected at the end of the system away from the supercharger by a control in which is disposed an automatically operated valve, said valve being adapted when open to establish common communication among all the pipes or when closed to shut them off from each other.

Another object is to provide a novel arrangement of the piping of an exhaust manifold for a turbocharged internal combustion engine in which a plurality of pipes extend from the supercharger an equal length along the engine with valve means disposed adjacent the ends of such pipes away from the supercharger to control the passage of the exhaust gases through the pipes so that the individual pipes separately supply the turbocharger with puff energy when the engine is under acceleration and so that all the pipes are placed in communication with each other to supply the turbocharger at a constant pressure when the engine is under full load.

Another object of the invention is to permit the best acceleration characteristics at no sacrifice to full load performance and also to permit the best full load operation at no sacrifice to best acceleration performance.

Other and further objects of the present invention will be apparent from the following description, the accompanying drawings, and the appended claims.

In the drawings:

Fig. 1 is an elevation view showing the invention applied to an eight cylinder V-type engine, the engine being omitted for clarity.

Fig. 2 is a sectional view taken on line 2—2 of Fig. 1.

Fig. 3 is an end view looking at the right end of Fig. 1.

Fig. 4 is a sectional view on line 4—4 of Fig. 1 showing the clearance in the bottom pipes to let the risers through to the top pipes.

Fig. 5 is a sectional view of the valve mechanism of the instant invention taken on line 5—5 of Fig. 6.

Fig. 6 is a sectional view taken on line 6—6 of Fig. 5.

Fig. 7 is a left end view of Figs. 1 and 5 showing the control crank; and

Fig. 8 is a perspective view of the valve.

The invention consists generally of an exhaust manifold which is adapted to supply the exhaust gases to the turbocharger in the form of puffs, when the engine is operating at low loads or is in acceleration; but which is controlled by an automatically operating valve so that the gases are supplied to the turbocharger at a constant pressure when the engine is operating at full load. In the conventional exhaust manifold of supercharged compression ignition engines, the end of the manifold away from the turbocharger is closed. Applicant has provided a valved control unit for connection to the pipes at the normally closed end of the manifold, such valve being adapted to maintain the pipes closed at that end, as in the conventional construction, but automatically to put the pipes into communication with each other when desired.

It is to be understood, however, that while the preferred arrangement is to locate the valve control unit at the normally closed end of the manifold, it may be disposed at the normally open or turbocharger end provided such arrangement permits the exhaust gases to encounter the valve before entry into the turbocharger nozzles. Likewise, an engine employing two turbochargers may have the valve located to establish communication between the pipes connecting the two turbochargers.

The illustrative embodiment of the invention is shown applied to the exhaust manifold of an eight cylinder V-type engine, although it is not intended that the application be limited to such an engine. Inlet branches or risers 10, flanged at 11 for securement to the engine, conduct the exhaust of the engine cylinders (not shown) to a multiple pipe system comprising an upper pair of pipes 12 and 12a and a lower pair of pipes 13 and 13a. The lower pipes are more widely spaced from each other than the upper pair (see Fig. 2) in order to permit the risers to pass therethrough for connection to the upper pipes. It can be seen in Fig. 1 that four of the risers are connected to the upper pair of pipes and four to the lower pair. At the turbocharger end of the manifold (the right end in Fig. 1), a coupling member 14 is provided for the reception of the four pipes, the coupling being flanged for connection to the turbocharger as indicated by the legend on Fig. 1.

In the conventional exhaust manifold for a turbocharged engine, each exhaust pipe extends from the turbocharger along the top of the engine only the distance necessary for connection to that riser feeding into it which is farthest from the turbocharger. For example, pipe 13, as shown in Fig. 1, would, in the conventional manifold, extend from coupling member 14 only to the fourth riser 10a. Applicant, however, makes all his four pipes of equal length so that they extend the full length of the engine. Conventionally, an exhaust manifold is closed at the end remote from the turbocharger. Applicant, however, mounts on this end of the manifold a control valve, generally indicated as 15, for connection with the manifold pipes in the manner and for the purposes hereafter described. As previously stated, the valve 15 may be at the turbocharger end or as part of the turbocharger itself although the preferred location is at the closed end of the manifold.

Exhaust control valve 15 is housed in a casting comprising flanged housing members 16 and 17 secured together by bolts 18. Member 16 is provided with four ducts 16a (Fig. 5) and is connected to the four exhaust pipes 12, 12a, 13, and 13a by expansion joints at 19. The four ducts 16a register with four ducts 17a in member 17, the latter four ducts being adapted to be brought into common communication by a rotary shutter valve in a central chamber, shown in perspective view in Fig. 8, and generally indicated at 20 in Fig. 5. A front wall 21 is arranged centrally of the casting opposite the valve, the surface of the wall being formed on casting unit 16. Wall 21 serves to form a part of the enclosure of the passage passing through valve 20.

Shutter valve 20 has a disc shaped body 22 which is integrally formed with a stem 23 and four circumferentially arranged shutters 24 spaced 90° apart. Stem 23 is mounted for rotation in flanged bearing 25 which is held in assembled position by a circular plate 26 fastened to member 17 by a series of bolts 27. A pin 29 extends through a bore 30 in stem 23 and has a flat head 31 to maintain the shutter valve in operative position. Pin 29 projects beyond plate 26 a sufficient distance for the attachment of control crank 32 thereto by any suitable means. A key 33 between pin 29 and the valve stem 23 insures rotation of the valve upon the rotation of crank 32. Crank 32 is rotatable as later described. Shutters 24 have sufficient width to close duct openings 34 in member 17 when valve 20 is rotated to closed position (see Fig. 6).

The operation of the manifold is as follows:

From an inspection of Fig. 6, it can be seen that valve 20 may be rotatably positioned so that each of the exhaust ducts 17a is closed off from communication with each and all of the other three ducts. The exhaust gases from each cylinder then pass through a single pipe to the turbocharger as in the conventional manifold which has a dead end. This is the arrangement desirable for acceleration. As the acceleration continues, valve 20 may be rotated by turning crank 32 manually, to open gradually as the load is increased or to snap open at a predetermined setting which ever is preferable to the engine. When the valve has been rotated 45° from its closed position (in the particular embodiment shown), there is full communication among all four pipes to give the full pipe effect. This is the arrangement desirable for full load operation. Spaced stops 35 and 36 (see Fig. 7) are formed on plate 26 to engage an offset portion 37 of crank 32 to limit the rotation of valve 20 in either direction. In Fig. 7, the crank is shown in full line position to close the valve and in alternate dotted line position to open the valve.

Thus it is apparent that by the instant invention the engine is enabled to take advantage of the multiple pipe system which benefits engine performance under acceleration conditions and to automatically change to the equivalent of a single large pipe system at full load which also benefits engine performance. Under the instant invention, therefore, the engine will run efficiently both when accelerating and when under full load, a condition heretofore unattainable because of the mutually exclusive conditions heretofore described.

While there has been hereinbefore described an approved embodiment of this invention, it will be understood that many and various changes and modifications in form, arrangement of parts and details of construction thereof may be made without departing from the spirit of the invention, and that all such changes and modifications as fall within the scope of the appended claims are contemplated as a part of this invention.

What I claim is:

1. An exhaust manifold for a multi-cylinder internal combustion engine of the class in which the exhaust gases drive a turbocharger comprising a plurality of separate pipes each having a discharge end; a plurality of inlet branches to the pipes, each branch connecting one pipe and the exhaust port means of an engine cylinder; a gas flow control device operably connected to each pipe, and means to actuate the control device between two extreme positions, said control device in one extreme position establishing full inter-communication among all the pipes for passage of the exhaust gases to the turbocharger and in the other extreme position, isolating each of the pipes from communication with each of the others so that the exhaust gases from each cylinder will pass to the turbocharger through its inlet branch and associated pipe only.

2. An exhaust manifold, according to claim 1, in which the pipes are arranged in parallel relation to each other and extend substantially the full length of the engine.

3. An exhaust manifold for a multi-cylinder internal combustion engine of the class in which the exhaust gases drive a turbocharger comprising a group of parallel pipes extending substantially the full length of the engine, each of the pipes having a discharge end and the discharge ends being disposed adjacent one another to drive the turbocharger; a plurality of inlet branches to the pipes, each branch connecting one pipe and the exhaust port means of a cylinder of a selected group of engine cylinders; a control device operably connected to all the pipes at their ends opposite the discharge ends, said device including a valve which in open position permits common communication among all the pipes and which in closed position cuts off communication between each pipe and all of the other pipes; and means to control the setting of such valve.

4. An exhaust manifold for a multi-cylinder internal combustion engine of the class in which the exhaust gases drive a turbocharger comprising a group of parallel pipes extending substantially the full length of the engine, each of the pipes having a discharge end and the discharge ends being disposed adjacent one another to drive the turbocharger; a plurality of inlet branches to the pipes, each branch connecting one pipe and the exhaust port means of a cylinder of a selected group of the engine cylinders; a control unit having a plurality of ducts each one of which is in communication with a pipe at its end opposite the discharge end of the pipe, said ducts leading into a common chamber; a valve in the chamber which in open position permits common communication among all the pipes and which in closed position cuts off communication between each pipe and all of the other pipes; and means to control the setting of such valve.

5. An exhaust manifold for a multi-cylinder internal combustion engine of the class in which the exhaust gases drive a turbocharger comprising a group of parallel pipes extending substantially the length of the engine and adapted to discharge into a turbocharger; a plurality of inlet branches to the pipes, each branch connecting one pipe and the exhaust port means of a cylinder in a selected group of the engine cylinders; a control unit having a plurality of ducts each one of which is in communication with one of the group of pipes, said ducts leading into a common chamber; a rotary shutter valve in the chamber; and means to actuate the valve, said valve when in open position permitting common communication among all the pipes so that each exhaust puff will pass through all the pipes to drive the turbocharger, and when in closed position cutting off communication between each pipe and all of the other pipes so that each exhaust puff will pass through a single pipe to drive the turbocharger.

References Cited in the file of this patent

UNITED STATES PATENTS

| Number | Name | Date |
|---|---|---|
| 1,761,960 | Armitage | June 3, 1930 |
| 2,359,615 | Browne et al. | Oct. 3, 1944 |